United States Patent [19]

Shook et al.

[11] Patent Number: 5,993,660
[45] Date of Patent: Nov. 30, 1999

[54] METHOD OF REMEDIATION OF CONTAMINANTS IN POROUS MEDIA THROUGH MINIMIZATION OF BOUYANCY EFFECTS

[75] Inventors: G. Michael Shook, Rigby, Id.; Gary A. Pope, Austin, Tex.

[73] Assignee: Lockheed Martin Idaho Technologies Company, Idaho Falls, Id.

[21] Appl. No.: 08/956,297

[22] Filed: Oct. 22, 1997

Related U.S. Application Data

[60] Provisional application No. 60/029,985, Nov. 7, 1996.

[51] Int. Cl.$^6$ ................ B01D 12/00; C02F 1/26
[52] U.S. Cl. ............ 210/643; 210/747; 210/925; 405/128; 510/365; 516/57; 516/63
[58] Field of Search .................. 252/312, 314; 210/643, 925, 747; 510/365; 588/901; 166/270.1; 516/57, 63; 507/929; 405/128

[56] References Cited

U.S. PATENT DOCUMENTS

| | | | |
|---|---|---|---|
| 3,596,715 | 8/1971 | Halbert, Jr. | 166/270.1 |
| 3,719,606 | 3/1973 | Froning et al. | 252/306 |
| 3,722,593 | 3/1973 | Poettmann | 166/305 |
| 3,981,361 | 9/1976 | Healy | 166/270.1 X |
| 4,206,809 | 6/1980 | Jones | 166/252 |
| 4,239,628 | 12/1980 | Vinatieri | 166/270.1 X |
| 4,302,051 | 11/1981 | Bass et al. | 299/2 |
| 4,402,552 | 9/1983 | Bass et al. | 299/7 |
| 4,741,399 | 5/1988 | Hurd et al. | 166/273 |
| 4,838,350 | 6/1989 | McCoy et al. | 166/270.1 |
| 4,848,460 | 7/1989 | Johnson et al. | 166/245 |
| 4,946,606 | 8/1990 | Osterloh | 252/312 X |
| 4,952,315 | 8/1990 | Saab | 405/128 X |
| 5,108,643 | 4/1992 | Loth et al. | 510/365 X |
| 5,221,159 | 6/1993 | Billings et al. | 405/128 |
| 5,277,518 | 1/1994 | Billings et al. | 405/128 |
| 5,316,085 | 5/1994 | Dawson | 166/369 |
| 5,319,966 | 6/1994 | Jackson et al. | 73/153 |
| 5,370,478 | 12/1994 | Bartlett et al. | 405/128 |
| 5,472,629 | 12/1995 | Lysy et al. | 510/365 X |
| 5,612,300 | 3/1997 | von Blücher et al. | 252/312 X |
| 5,645,374 | 7/1997 | Lesage et al. | 405/128 |

*Primary Examiner*—Richard D. Lovering
*Attorney, Agent, or Firm*—Thorpe North & Western

[57] ABSTRACT

A method for controlling vertical migration of contaminants in an aquifer includes introduction of a solubilizing solution having a surfactant and an alcohol or other light co-solvent. The surfactant is selected to solubilize the contaminant. The alcohol or other solvent is selected to provide the microemulsion with a substantially neutral buoyancy with respect to groundwater. The neutral buoyancy of the microemulsion prevents the normal downward movement which is typical of the solubilized dense non-aqueous phase liquid in surfactant-enhanced aquifer remediation. Thus, the risk that any significant amount of the solubilized dense non-aqueous contaminants will migrate vertically can be controlled. The relative tendency for vertical migration may also be reduced by increasing the injection rate or injected fluid viscosity (by adding polymer), or by reducing the well spacing.

62 Claims, 6 Drawing Sheets

FIG. 1A Solubilization of PCE by Various Surfactant Solutions

| Surfactant Solution | Surfactant Concentration | PCE Solubilized (mg/L) |
|---|---|---|
| Water | 0% | 240 |
| 1:1 blend of nonylphenol ethoxylate and it's phosphate ester | 2% | 11,700 |
| 1:1 blend of sodium diamyl and dioctyl sulfosuccinates in 500 mg $CaCl_2$/L | 4% | 85,000 |
| Nonylphenol ethoxylate | 1% | 1,300 |

FIG. 1B Results from Phase 1 Surfactant Flood, Hill AFB, OU2, May 1996

| Monitor well | Ground-water cocentrations in mg/L prior to surfactant flooding | | | Peak ground-water concentrations in mg/L during surfactant flooding | | |
|---|---|---|---|---|---|---|
| | TCE | TCA | PCE | TCE | TCA | PCE |
| SB-6 | 700-1000 | 150-250 | 15-25 | 40,780 | 9,160 | 3,320 |

METHOD OF REMEDIATION OF CONTAMINANTS IN POROUS MEDIA THROUGH MINIMIZATION OF BOUYANCY EFFECTS

RELATED APPLICATIONS

The present application claims priority from Provisional Application Ser. No. 60/029,985, which was filed on Nov. 7, 1996.

CONTRACTUAL ORIGIN OF THE INVENTION

The United States Government has rights in this invention pursuant to Contract No. DE-AC07-94ID13223 between Lockheed Martin Idaho Technologies Company and The United States Department of Energy.

BACKGROUND OF THE INVENTION

1. Field of the Invention

The present invention relates to a method for removing dense non-aqueous phase liquids in porous media by the use of surfactant-enhanced aquifer remediation. More particularly, the present invention involves the use of solutions which produce generally neutral buoyancy during the cleanup of dense non-aqueous phase liquids to control vertical migration and thus enable surfactant-enhanced aquifer remediation in aquifers lacking a clay bottom layer or other form of aquiclude to prevent downward migration of the solubilized dense non-aqueous phase liquids. Additionally, such a method of aquifer remediation can also be used on aquifers having an aquiclude.

2. State of the Art

For many years little care was taken in the handling of organic solvents and other materials which were used in industry and at government installations, such as military bases. Because of poor handling techniques and occasionally intentional dumping, many industrial sites and military bases now have contaminated areas containing relatively high concentrations of the contaminants. Chlorinated solvents such as trichloroethylene and perchloroethylene and other types of organic liquids are common at such sites and, if not removed, can filter down into groundwater supplies, rendering the water unfit for consumption and other uses.

A variety of techniques have been used to promote the removal of such chemical contaminants both from the soil and from the groundwater. The principle method of groundwater remediation currently used where dense, non-aqueous phase liquids are involved utilizes what is commonly referred to as "pump and treat". In such a method wells are drilled into the contaminated area and contaminated groundwater is pumped above the surface, where it is treated to remove the contaminants.

The limitations of the pump and treat method have been documented in articles such as Mackay, D. M. and J. A. Cherry, Groundwater Contamination: Pump and Treat Remediation, 23(6) ENVIRON. SCI. TECHNOL. 630–36, 1989. The article concludes that pump and treat remediation can only be relied upon to contain ground-water contamination through the manipulation of hydraulic gradients within an aquifer. The reasons for the failure of pump-and-treat to decontaminate aquifers are rooted in the limited aqueous solubility of many dense, non-aqueous liquids in groundwater and other processes involving contaminant desorption and diffusion. Because of the low aqueous solubility of most dense non-aqueous liquids, their removal by groundwater extraction requires exceptionally long periods of time.

Figure 1A:
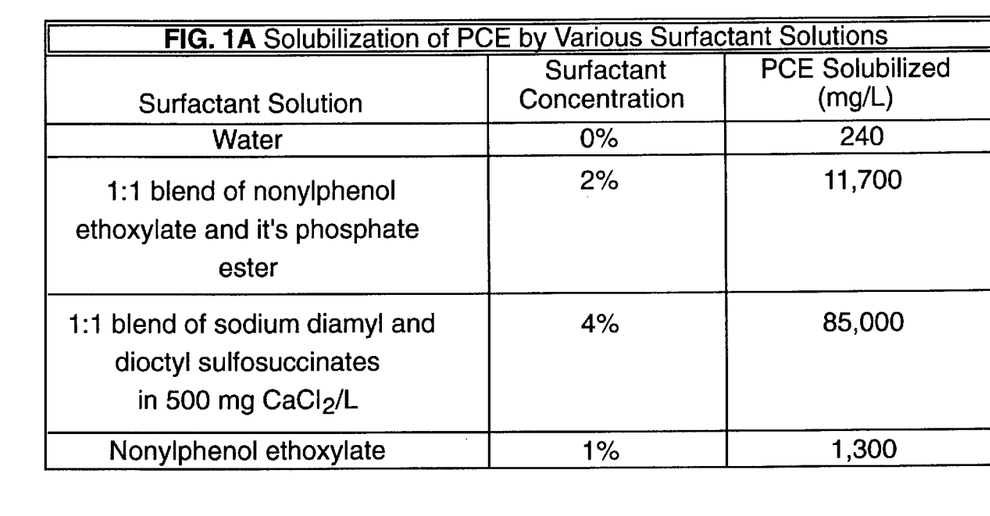
FIG. 1A is a table showing the solubilization of perchloroethylene by various surfactant solutions.
Figure 1B:
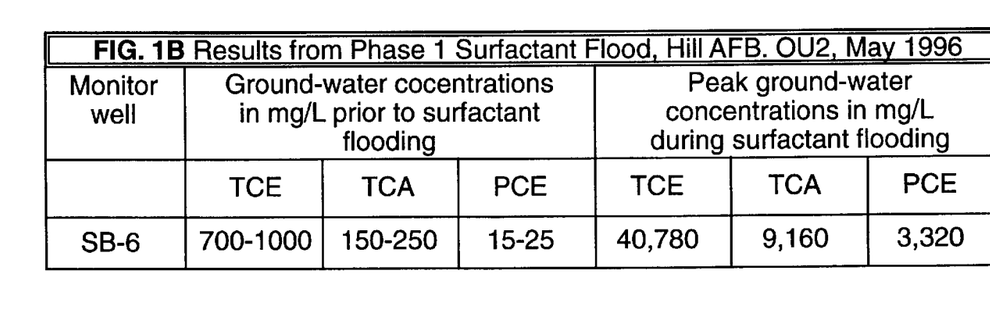
FIG. 1B shows a table showing the enhancement of dense non-aqueous phase liquid removal by use of surfactants.

Due to the general impractability of the pump and treat method, considerable attention has been paid recently to methods which utilize a process commonly referred to as enhanced solubilization. Such a method uses micellar surfactant solutions to increase the effective solubility of the dense non-aqueous contaminants to accelerate the rate of removal. The mechanism for solubilization displayed by surfactants arises from the formation of microemulsions by the surfactants, water, and the solubilized dense non-aqueous liquid molecules. For example, FIG. 1A shows a table of solubilization of perchloroethylene (PCE) by various nonionic and anionic surfactant solutions. The results indicated that even dilute surfactant solutions can significantly increase the aqueous solubility of perchloroethylene.

The effectiveness of the surfactant enhanced aquifer remediation or solubilization method was studied in a major field test on in-situ solubilization by Professor J. C. Fountain of the State University of New York at Buffalo. Fountain, J. C. et al., A Controlled Test of Surfactant-Enhanced Aquifer Remediation, 34(5) GROUNDWATER 910–916 (1996). The test consisted of the controlled release of 231 liters of perchloroethylene into a shallow sand aquifer having a clay aquiclude formed, thereunder.

Prior to conducting the test, an estimated 70 liters of PCE was excavated from the test bed. Free phase extraction and water-flooding removed another 49 liters of the contaminant. A 2 percent mixture of nonylphenol ethoxylate and phosphate ester of an alkylphenol ethoxylate was injected into the aquifer through 5 wells on one side of the spill, and removed by five wells on the opposing side. The surfactant flood resulted in extraction of another 67 liters of PCE. Extraction was primarily due to solubilization of the contaminant, though some mobilization of PCE occurred as well.

Excavation of the site suggested that about 16 liters of perchloroethylene was not removed by the surfactant flood. This volume was found pooled above the clay aquiclude at the bottom of the aquifer.

Others have tested surfactants which will produce a sufficiently low interfacial tension to remove substantially all of the dense non-aqueous phase liquid contaminant. Tests utilizing a microemulsion with an interfacial tension (IFT) of less than 0.01 dyne/cm have removed all measurable dense non-aqueous phase liquids (DNAPL) in the test section. Reduction of IFT between the DNAPL and microemulsion results in a combination of mobilization and solubilization of the contaminants. This application of surfactant-enhanced aquifer remediation is very effective, but nevertheless does not address the concern over uncontrolled, vertical migration of the free-phase DNAPL (during mobilization), or of a microemulsion containing the DNAPL compounds (during solubilization) in aquifers not underlain by an aquiclude. The technology described herein is designed to address such concerns over vertical migration. In that light, then, the application of surfactant-enhanced aquifer remediation described here is one in which only solubilization of the DNAPL compounds occur. That is, this technology is specifically designed to ensure that no mobilization of the DNAPL occurs.

Figure 1C:
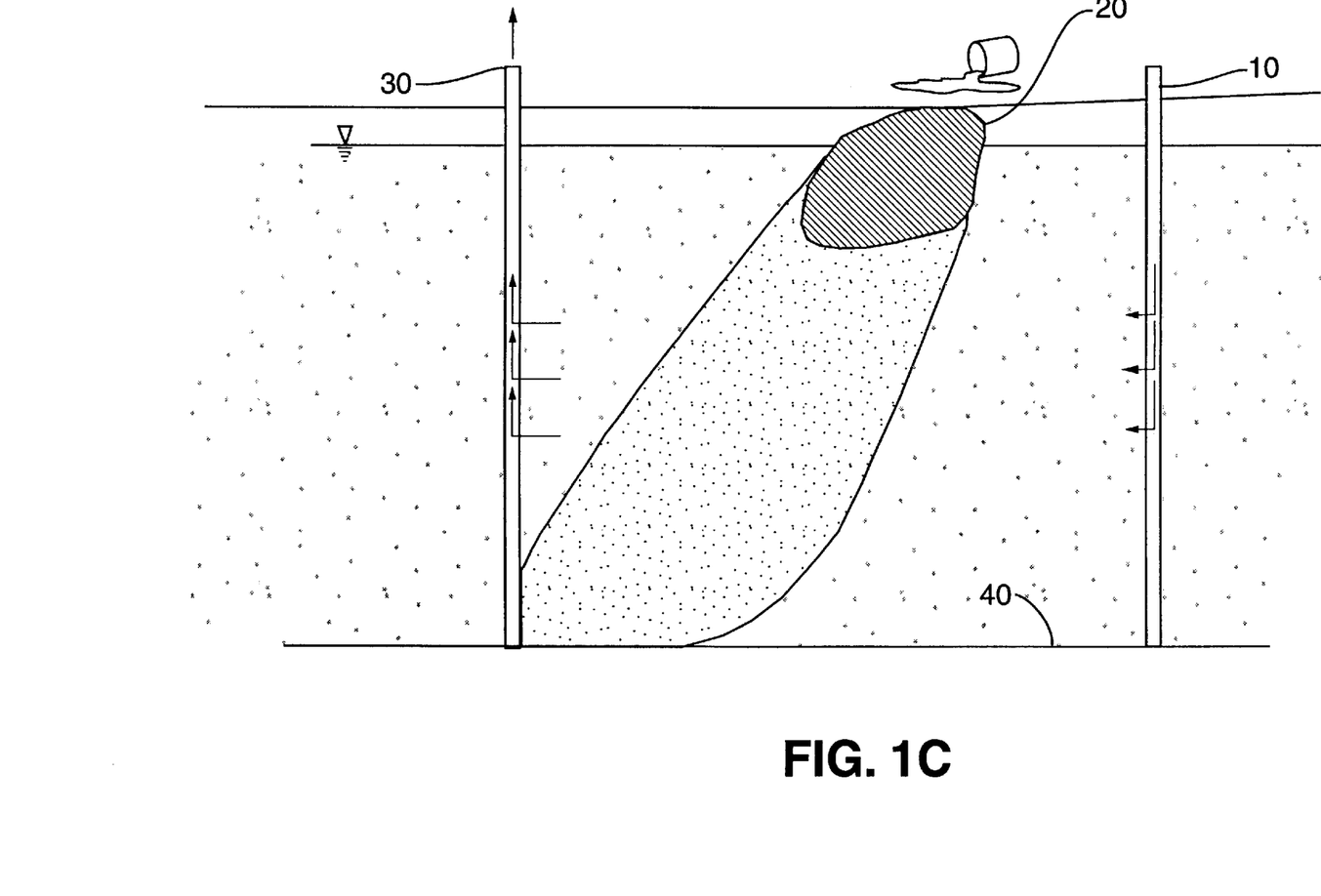
FIG. 1C shows a schematic representation of the solubilization/surfactant-enhanced aquifer remediation in accordance with the teachings of the prior art.

Referring now to FIG. 1C, there is shown a cross sectional view of the application of the surfactant-enhanced aquifer remediation system at work. A well 10 is formed on one side of the spill area 20 and is configured for flooding the spill area with a surfactant, such as one of those described above. As the dense non-aqueous phase liquid is solubilized, it is carried to an extraction well 30 disposed on the opposite side of the spill area 20. While the solubilized dense, non-aqueous phase liquid moves through the aquifer, it may continue to migrate vertically due to the microemulsion's density relative to the surrounding groundwater. Generally, a sufficiently thick aquiclude 40 such as a clay or shale layer will preclude its continued migration. Thus, despite such vertical migration of the dense, non-aqueous liquid contaminants, over time the entire spill area is substantially cleaned of the contaminant if wells are screened all of the way to the aquiclude.

One serious drawback with the surfactant-enhanced aquifer remediation is that the vertical mobility of the solubilized dense non-aqueous phase liquid substantially requires that an aquiclude be present to catch any solubilized contaminant which migrates sufficiently vertically.

Many aquifers, however, lack such an aquiclude. If the traditional surfactant-enhanced aquifer remediation method were to be used with an aquifer lacking an aquiclude, there is a significant risk that the solubilized dense non-aqueous liquid will spread vertically and contaminate an increasingly large volume.

Thus, there is a need for an improved method of extracting dense non-aqueous phase liquids from aquifers. Such a method must minimize vertical mobility of the solubilized material, while providing relatively quick clean-up of the contaminants.

SUMMARY OF THE INVENTION

Thus, it is an object of the present invention to provide an improved method for remediation of non-aqueous phase liquids through solubilization of the contaminants in a microemulsion.

It is another object of the present invention to provide such a method which can be used in aquifers which do not have an aquiclude below without risking the spread of the contaminant.

It is yet another object of the present invention to provide such a method for contaminant remediation which minimizes vertical mobility of the contaminant so as to prevent the contaminant from spreading.

It is still another object of the present invention to provide a method for remediation of aquifers contaminated with dense non-aqueous phase liquids wherein the method floods the contaminated area with a solution which causes the contaminants to have substantially neutral buoyancy with respect to groundwater to thereby facilitate removal of the contaminants from the aquifer with minimum vertical spreading of the contaminant.

It is still another object of the present invention to provide a method for aquifer remediation which quickly removes dense non-aqueous phase liquids from contaminated aquifers and the like.

It is still yet another object of the present invention which enables prediction of vertical migration of the solubilized dense non-aqueous compounds and enables manipulation of the vertical migration by controlling design parameters of the remediation method to enable extraction of the contaminants through an extraction well. By such prediction and manipulation of vertical migration, the dense, non-aqueous phase liquids can be safely removed without risking contamination of the soil and water sources below the contaminated site.

The above and other objects of the invention are realized in specific illustrated embodiments of a method for remediation of dense non-aqueous phase liquids including forming a well for introduction of a solubilizing solution having a surfactant and an alcohol or other light co-solvent. The surfactant is selected to solubilize the dense non-aqueous phase liquid. The alcohol or other light co-solvent is selected and injected in a sufficient quantity to provide the microemulsion with a reduced density for the purpose of giving it a substantially neutral buoyancy with respect to groundwater. Adding co-solvents to the injected surfactant also provides other benefits, including improving the phase behavior of the resulting microemulsion phase. The neutral buoyancy of the microemulsion prevents the downward movement which is typical of the solubilized dense non-aqueous liquid contaminants in the surfactant-enhanced aquifer remediation. Thus, the risk that any significant amount of the solubilized dense, non-aqueous phase liquid will migrate vertically can be controlled.

In accordance with one aspect of the present invention, it has been found that vertical migration of a more dense phase, in this case a microemulsion containing a significant amount of the dense non-aqueous, is described by only three dimensionless groups: a gravity number, a mobility ratio and an effective aspect ratio. By utilizing these groups, such variables as injection rate, injected fluid viscosity, microemulsion phase density and well spacing can be manipulated, and the amount of vertical mobility can be calculated. This enables extraction wells to be screened sufficiently deeply to withdraw all of the microemulsion and prevent vertical migration below the treated area. Additionally, by controlling the injection rate, injected fluid viscosity, microemulsion phase density and the well spacing, the buoyancy, and thus vertical mobility, can be controlled to provide desired extraction of dense, non-aqueous phase liquid constituents in a microemulsion while minimizing expense and treatment time.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 2:
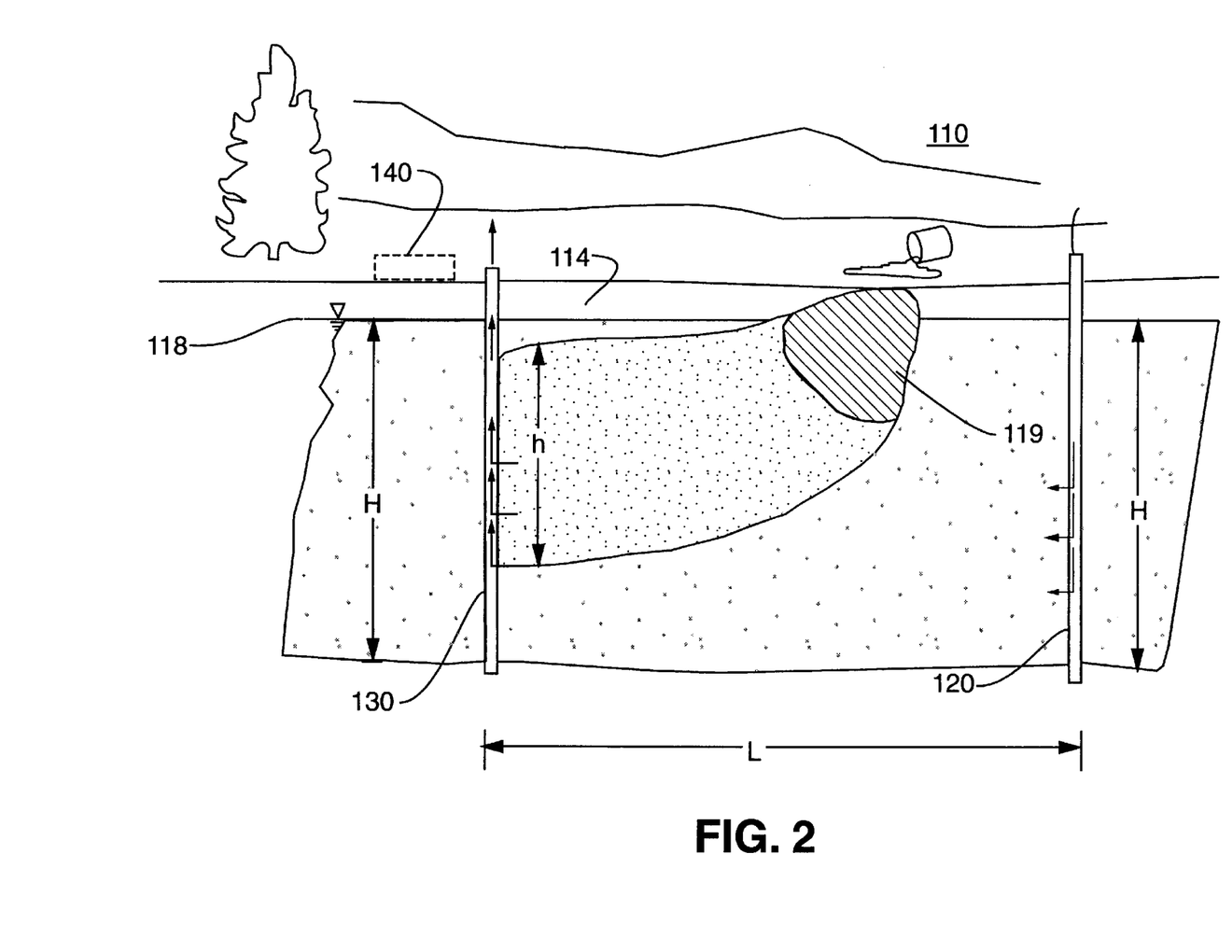
FIG. 2 is a schematic representation of a method of remediation of dense non-aqueous phase liquids in porous media through minimization of buoyancy effects in accordance with the present invention.

Referring to FIG. 2, there is shown a schematic representation of a method of remediation of dense non-aqueous phase liquids in porous media through minimization of buoyancy effects in accordance with the present invention. Initially a contaminated site 110 containing dense non-aqueous phase liquids, such as perchloroethylene or trichloroethylene, which have passed through the vadose zone 114 and below the water table 118. As the contaminant moves through the porous media, a portion of it is trapped as a residual saturation 119. A first well 120 is drilled into the soil adjacent the contaminated site 110. The first well 120 is configured for the introduction into the groundwater supply of a solution containing a surfactant and a light co-solvent (typically an alcohol). As will be discussed below, the solution will also often contain a polymer for altering the solution's viscosity.

A second well 130 is drilled on the opposite side of the contaminated site 110. The second well 130 is configured for withdrawing contaminated groundwater and the microemulsion that a forms in-situ when the surfactant and light co-solvent solubilize the dense non-aqueous phase liquid constituents. The contaminated groundwater is then treated by air stripping or some other treatment system 140 to clean the water.

Those skilled in the art will appreciate that the first and second wells, 120 and 130 are conventional and are commonly used in contamination removal. Those skilled in the art will also appreciate that while discussed herein as two wells, the number of wells is dependent on the size of the spill and it is not uncommon to have multiple wells formed on opposing sides of the contaminated area 110.

While conventional wells are formed to practice the present invention, the method for utilizing the wells to significantly improve the ability to clean dense non-aqueous phase liquids in aquifers lacking an aquiclude is unique. Specifically, the present invention enables the user to control a host of variables to efficiently and effectively clean the dense non-aqueous phase liquids without the risk of vertical migration which has previously prevented the use of surfactant-enhanced aquifer remediation on aquifers lacking an aquiclude.

The screened interval of each well and the distance between the wells depends upon the specific characteristics of the aquifer and the location and volume of the non-aqueous phase liquid. This initial information can, for example, be obtained by the use of partitioning and conservative interwell tracer tests which are well known in the art. These tests can measure the volume and distributions of the dense non-aqueous phase liquid in the interwell zone (i.e. the area between the opposing wells).

In addition to the partitioning and conservative interwell tracer tests, laboratory or field tests may also be conducted prior to application of the surfactant, etc., in accordance with the present invention to ensure that the surfactant/light co-solvent (typically alcohol) combination provides a generally neutral buoyancy when combined with the particular contaminant to be removed and in order to ensure solubilization of a significant amount of the dense non-aqueous contaminants in a microemulsion. A microemulsion, as used herein, is any stable mixture of surfactant, co-solvent, non-aqueous phase liquids, and water. In order to develop substantially neutral buoyancy, a cosolvent that is significantly lighter than the contaminant to be solubilized is added to the injected chemicals. Because the density of the contaminants and co-solvents offset one another, the microemulsion has substantially the same buoyancy as the groundwater which reduces or eliminates its tendency to migrate vertically. In other words, sufficient; quantities of the lighter cosolvent counteract the heavier weight of the contaminants to help the microemulsion to remain in substantially the same vertical position.

While the initial objective of the experiments which lead to the present invention was to simply reduce the density of the resulting microemulsion, it has been found that vertical migration of a microemulsion containing the dense, non-aqueous compounds is described by dimensionless scaling groups: a "gravity number", "a mobility ratio" and an "effective aspect ratio." Numerical simulations show that the extent of vertical migration can be predicted on the basis of these scaling groups. Embedded in these scaling groups are five design parameters which, if properly manipulated, enable withdrawal of the contaminant without causing contamination deeper in the aquifer. These design parameters are injection rate, microemulsion phase density, microemulsion viscosity, well spacing, and well screen position. Through manipulation of these design parameters, a cleanup can be designed in which vertical migration is controlled.

If desired, testing in a laboratory setting can be undertaken to ensure that the projected vertical mobility of the microemulsion is accurate, thereby ensuring that the extraction well(s) are sufficiently deep and screened appropriately to remove even that portion of the microemulsion which demonstrates some vertical mobility. However, excellent agreement has been obtained between the predicted and observed migration in experiments already conducted. This demonstrates that hydraulic control over the contaminant can be maintained, and that dense non-aqueous phase liquid remediation can be addressed in even those aquifers lacking a clay or shale aquiclude with little risk of downward migration of the contaminants.

Through the use of "scaling" analysis (e.g., inspectional or dimensional analysis), the partial differential equations describing flow in an aquifer in dimensionless terms have been analyzed. These equations explicitly treat the dense, nonaqueous phase to be immobile; the contaminants are transported only in the microemulsion phase. The advantage of using dimensionless equations is that the solutions apply to all problems that are geometrically similar; solutions are applicable to both lab and field scale, thereby ensuring that lab results will be consistent with the results actually achieved by remediation of the contaminated site. In doing so, it has been shown that the vertical migration of a more dense phase (i.e., a microemulsion that contains solubilized dense non-aqueous contaminants) is a function of only three dimensionless groups: a gravity number, $N_g$, the mobility ratio, M, and an effective aspect ratio, $R_L$. These are defined as follows (the subscript "me" refers to the microemulsion phase).

$$N_g = \frac{[k_h k_v]^{1/2} k^*_{rme} \Delta \varrho g}{\mu_{me} U_T}; \quad \Delta \varrho = \varrho_{me} - \varrho_w$$

$$R_L = \frac{L}{H} \sqrt{\frac{k_v}{k_h}}$$

-continued $$M = \frac{k_{rme}}{\mu_{me}} \frac{\mu_w}{k_{rw}}$$

Wherein k is permeability (h=horizontal, v—vertical), H (FIG. 2) is the aquifer thickness, and $k_{rme}$ is the relative permeability to the microemulsion phase and $k_{rw}$ is the relative permeability to the water phase within the aquifer. Also within these dimensionless groups are four design parameters:

1) microemulsion phase density, $\varrho_{me}$;
2) microemulsion viscosity, $\mu_{me}$;
3) injection rate, which directly affects darcy velocity ($U_r$);
4) well spacing, L.

By controlling the value of these design parameters, we are able to control the value of the scaling groups. It is important to realize that the specific value of any given parameter within the scaling group is a unimportant; it is the value of the group that describes the vertical migration. It should further be noted that the exact form of the scaling groups is unimportant. The method shows how the design parameters affect vertical migration. Therefore, the amount of migration of the contaminant can be manipulated. Manipulating the amount of migration of the contaminant can be accomplished by the well positioning and screen depth, control of the injection and extraction rates of the wells, and of the microemulsion density and viscosity.

Figure 3A:
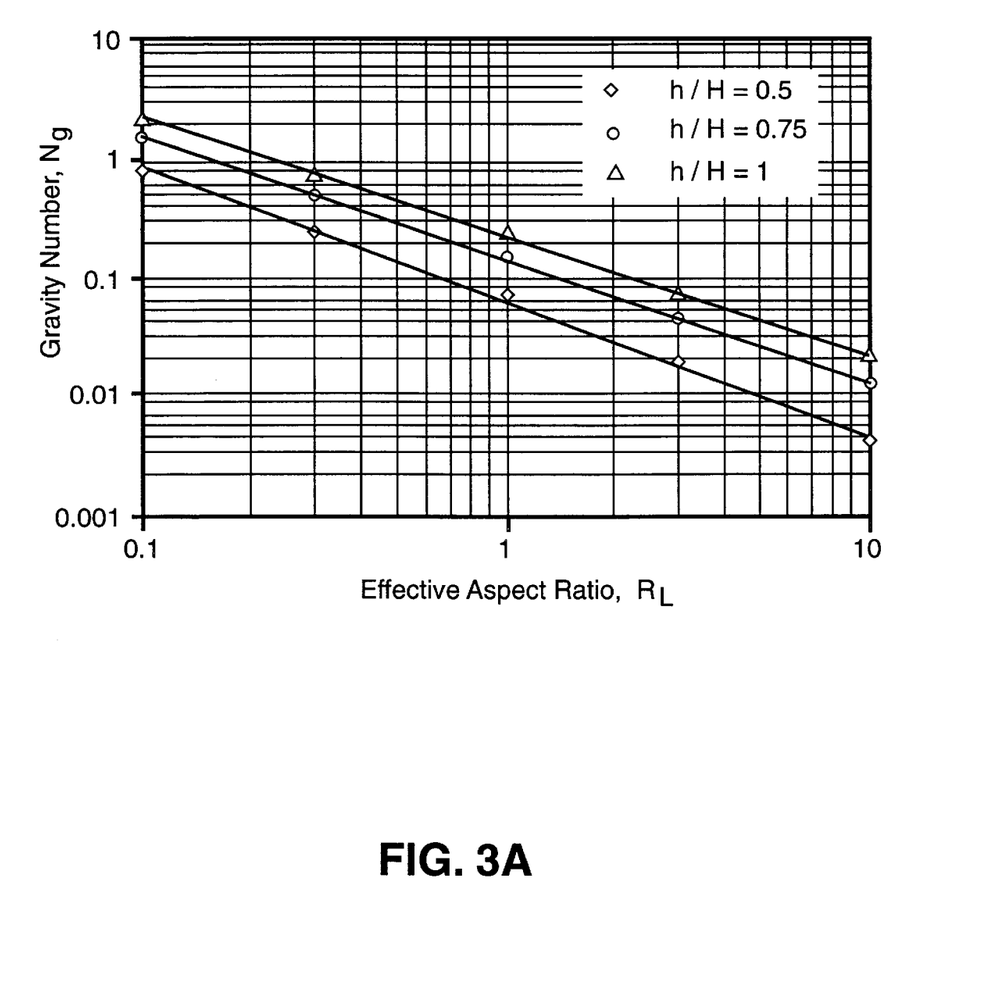
FIG. 3A is a graph demonstrating vertical migration as a function of the scaling groups $N_g$ and $R_L$ where the mobility ratio is 0.5.
Figure 3B:
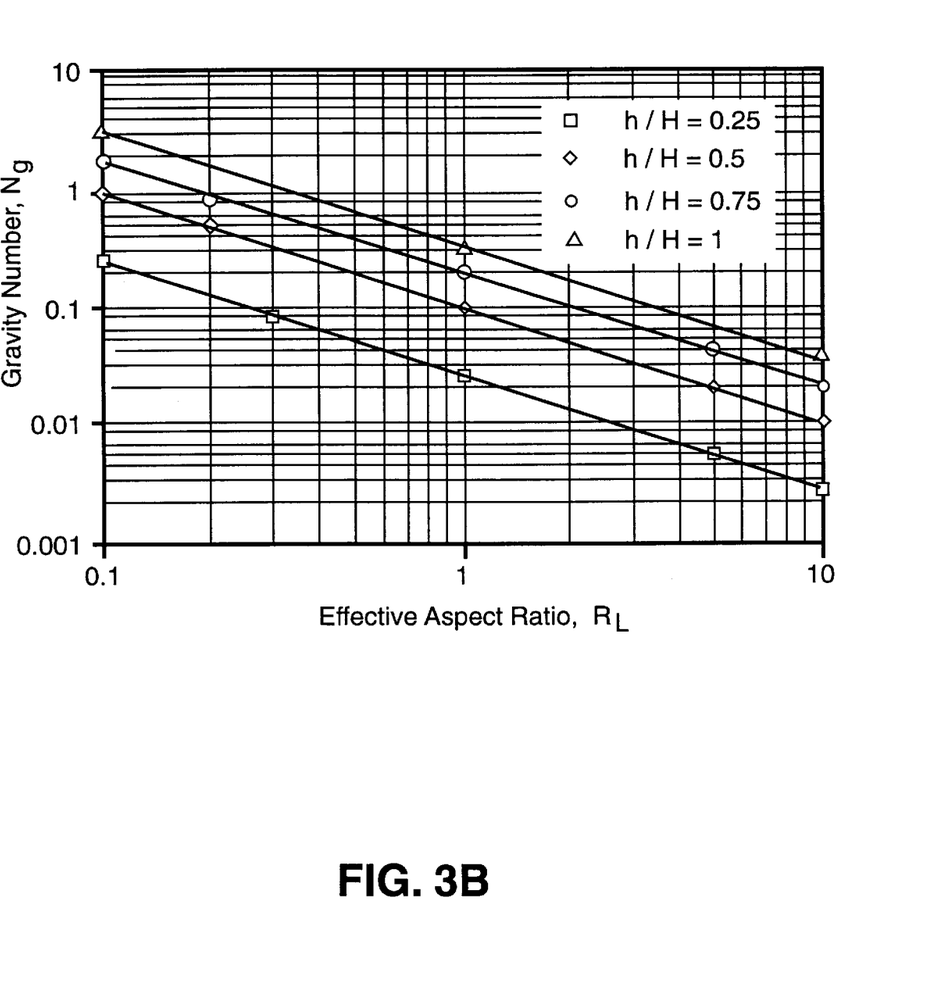
FIG. 3B is a graph demonstrating vertical migration as a function of the scaling groups $N_g$ and $R_L$ where the mobility ratio is 1.
Figure 3C:
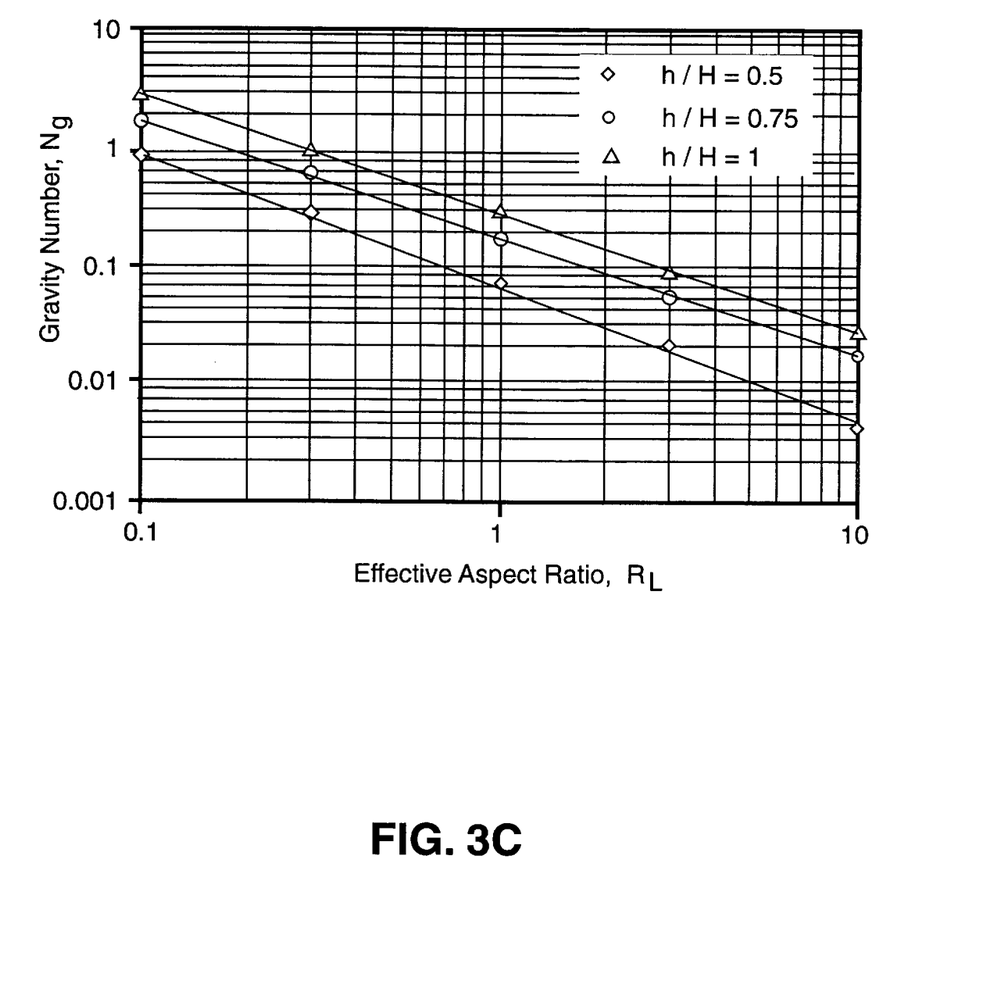
FIG. 3C is a graph demonstrating vertical migration as a function of the scaling groups $N_g$ and $R_L$ where the mobility ratio is 2.

Non-dimensionalizing the governing equations shows that vertical migration of the microemulsion is a function only of these three scaling is groups. However, it does not indicate what the relationship specifically is. Therefore, numerical simulations of vertical migration as a function of these scaling groups has been conducted. Results are shown in FIGS. 3A through 3C. These figures show that vertical migration of the contaminant is predictable and is a function of the scaling groups, where in this example the mobility ratio is 0.5, 1, and 2, respectively. Experiments which have been performed validate the theory. The experiment's predicted migration agreed within 5% of the observed migration in the experiment. Therefore, in light of the present invention, the migration of contaminants solubilized in a microemulsion in the subsurface is a predictable quantity, and a remediation strategy can be designed that captures the full plume without the need for an aquiclude.

Once the preliminary tests have been conducted,(which will typically include numerical simulation to design the cleanup operations), the wells are drilled adjacent the contamination site 110 (FIG. 2) as set forth above. The surfactant is then combined with the light co-solvents and the polymer. The surfactant may be those typically used with surfactant-enhanced aquifer remediation, such as those set forth in FIG. 1A. The light co-solvent will preferentially be an alcohol, such as ethanol or isopropanol, and will be used in sufficient quantity to lower the microemulsion density to some predetermined value wherein the risk of downward vertical migration below the area of the aquifer being treated is substantially reduced. Adding water-soluble polymer to the injected solution increases its viscosity and the viscosity of the microemulsion which forms in-situ. The preferred polymer type is a water-soluble biopolymer which is highly biodegradable, such as xanthan gum. There are many other suitable polymers that could also be used for this purpose.

Once solution(s) containing the surfactant, alcohol and polymer have been circulated through the contaminated site 110 for a sufficient length of time, additional partitioning interwell tracer tests may be conducted on the contaminated area to demonstrate that the contaminants have been removed.

Based on the tests run to date, it is apparent that the present invention not only enables the relatively accurate determination of vertical mobility of the microemulsion, it also enables those operating the wells to manipulate the buoyancy of the dense non-aqueous liquid contaminants by the use of the alcohol to obtain substantially neutral buoyancy. This, in turn, allows for the remediation of aquifers lacking an aquiclude with surfactants without the risk of spreading the contaminants.

It should be noted that substantially neutral buoyancy may be attained in various ways. The easiest to see is by reducing the microemulsion density to that of groundwater. In that case, the microemulsion has exactly zero tendency for further vertical migration. An alternative is to reduce the microemulsion density to some specified design value (greater than that of groundwater), and then to increase the relative magnitude of the horizontal driving force. Either of these options results in a decrease of the relative importance of buoyancy. The horizontal forces are manipulated by increasing the injection rate, increasing the injected fluid viscosity (by adding polymer), or decreasing the well spacing.

In use, the equations used to determine gravity number, mobility ratio and effective aspect ratio may typically be programmed into a computer. Samples will be taken to determine the permeability of the aquifer and other site-dependent variables. Then, those conducting the site clean-up can adjust parameters of well location, injection rate, etc. and determine the most effective engineering designs for cleaning the contaminated site. If desired, sensors or periodic testing could be provided so that the computer continually controls such factors as injection rate, viscosity of the injected solution, etc.

Thus there is disclosed an improved method for remediation of dense non-aqueous phase liquids in aquifers through minimization of buoyancy effects. Those skilled in the art will appreciate numerous modifications which can be made without departing from the scope and spirit of the present invention. The appended claims are intended to cover such modifications.

We claim:

1. A method for removing dense non-aqueous phase liquids from a contaminated aquifer, the method comprising:
    (a) forming a first well in the ground, the first well being disposed adjacent the dense non-aqueous phase liquids contaminating the aquifer;
    (b) forming a second well spaced from the first well such that dense non-aqueous phase liquids are between the first well and the second well;
    (c) controlling the vertical migration of the dense non-aqueous phase liquids within the aquifer by injecting a solution containing at least one surfactant and a light co-solvent into the first well so as to release said solution into the contaminated aquifer so as to form a microemulsion of the surfactant, the dense non-aqueous liquid contaminants and the light co-solvent within the aquifer; and
    (d) extracting the microemulsion containing the dense non-aqueous liquid contaminants from the second well.

2. The method for removing dense non-aqueous phase liquids from a contaminated aquifer of claim 1, wherein step (c) comprises, more specifically, utilizing sufficient co-solvent that the resulting microemulsion density is less than the density of water.

3. The method for removing dense non-aqueous phase liquids from a contaminated aquifer of claim 1, the method comprising, more specifically, injecting a solution comprising surfactant and alcohol.

4. The method for removing dense non-aqueous phase liquids from a contaminated aquifer of claim 3, wherein the method comprises, more specifically, injecting an alcohol having a density less than water.

5. The method for removing dense non-aqueous phase liquids from a contaminated aquifer of claim 1, the method comprising, more specifically, injecting a solution which further includes a polymer.

6. The method for removing dense non-aqueous phase liquids of claim 5, wherein the polymer is a water-soluble biopolymer.

7. The method for removing dense non-aqueous phase liquids of claim 5, wherein the polymer is a water-soluble synthetic polymer.

8. The method for removing dense non-aqueous phase liquids of claim 1, wherein the method further comprises the more specific step of applying a plurality of factors in combination with the injecting of solution which affect vertical migration of the microemulsion through the aquifer, said factors being selected from the group consisting of viscosity and density of the contaminants and solution, permeability, injection rate and thickness of the aquifer, and optimizing interwell distances responsive to said factors.

9. The method for removing dense non-aqueous phase liquids of claim 8, wherein the method further comprises selecting depth of screening of the wells based on the determined factors which affect the anticipated amount of vertical migration.

10. The method for removing dense non-aqueous phase liquids of claim 1, wherein the method further comprises predicting the vertical migration of solubilized contaminant in light of a calculated gravity number, a calculated mobility ratio, and a calculated effective aspect ratio.

11. The method for removing dense non-aqueous phase liquids of claim 10, further comprising, more specifically, providing a second well which is configured to extract the microemulsion down to at least the lowest point of predicted vertical migration.

12. The method for removing dense non-aqueous phase liquids of claim 1, wherein the method further comprises disposing the first and second wells in an aquifer lacking an aquiclude.

13. The method for removing dense non-aqueous phase liquids of claim 1, wherein the method further comprises controlling a plurality of factors which affect vertical migration and floats rate of the microemulsion through the aquifer, said factors being selected from the group consisting bouyancy of the microemulsion, viscosity of the microemulsion, density of the microemulsion, injection rate of the solution, and interwell distances.

14. The method for removing dense non-aqueous phase liquids of claim 13, wherein the method further comprises selecting depth of screening of the wells based on the factors which affect vertical migration.

15. The method for removing dense non-aqueous phase liquids of claim 13, wherein the method further comprises predicting the vertical migration of the solubilized contaminant in light of permeability and thickness of the aquifer, a calculated gravity number, a calculated mobility ratio, and a calculated effective aspect ratio.

16. The method for removing dense non-aqueous phase liquids of claim 15, further comprising, more specifically, providing a second well which is configured to extract the microemulsion down to at least the lowest point of predicted vertical migration.

17. The method for removing dense non-aqueous phase liquids of claim 16, wherein the method further comprises disposing the first and second wells in an aquifer lacking an aquiclude.

18. A method for forming an in-ground microemulsion from dense non-aqueous liquid contaminants in an aquifer so as to reduce vertical migration of the contaminants, the method comprising:

a) forming a well in an aquifer contaminated with dense non-aqueous liquids;

b) injecting a solution into the well, the solution having a surfactant and a light co-solvent in an effective quantity to form a microemulsion of solubilized contaminants;

c) controlling a plurality of factors which affect vertical migration and flow rate of the microemulsion through the aquifer, said factors being selected from the group consisting of viscosity of the microemulsion, density of the microemulsion, injection rate of the solution; and d) forming a second well in the aquifer to extract the solubilized microemulsion.

19. The method according to claim 18, wherein the method comprises, more specifically, injecting a solution comprising surfactant and alcohol.

20. The method according to claim 19, wherein the method comprises, more specifically, injecting a solution having a surfactant and an alcohol, the alcohol having a lesser density than water.

21. The method according to claim 18, wherein the method comprises, more specifically, adding a water-soluble polymer to the solution to control viscosity in the solution.

22. The method according to claim 21, wherein the water-soluble polymer is a biopolymer.

23. The method according to claim 22, wherein the method further comprises determining the vertical mobility of the microemulsion and forming the second well to a depth correlated to the vertical mobility of the microemulsion to ensure that the microemulsion does not migrate to a depth below the second well.

24. The method according to claim 21, wherein the water-soluble polymer is a synthetic polymer.

25. The method according to claim 24, wherein the method further comprises controlling well spacing to improve recovery of the microemulsion by reducing the tendency for vertical migration.

26. A method for remediation of a site contaminated with dense nonaqueous phase liquids comprising the steps of claim 18, and further comprising forming a second well into the aquifer and extracting the microemulsion of dense non-aqueous phase liquid, surfactant and co-solvent from the second well.

27. A method for predicting the vertical migration of a microemulsion comprising a dense non-aqueous phase liquid and a surfactant, the method comprising the following steps with steps (a) through (i) in any particular order:

(a) measuring a horizontal permeability ($k_h$) of an aquifer;

(b) measuring a vertical permeability ($k_v$) of a aquifer;

(c) measuring a thickness (H) of the aquifer;

(d) determining the relative permeability to a microemulsion phase ($k_{rme}$);

(e) determining the relative permeability to a water phase ($k_{rw}$);

(f) determining the microemulsion phase density ($\varrho_{me}$);

(g) determining microemulsion viscosity ($\mu_{me}$);
(h) selecting an injection rate ($U_T$);
(i) selecting a well spacing (L);
(j) determining a gravity number ($N_g$), a mobility ratio, (M), and an effective aspect ratio ($R_L$), as follows:

$$N_g = \frac{[k_h k_v]^{1/2} k^*_{rme} \Delta \varrho g}{\mu_{me} U_T}; \quad \Delta \varrho = \varrho_{me} - \varrho_w$$

and $$M = \frac{k_{rme}}{\mu_{me}} \frac{\mu_w}{k_{rw}}$$

$$R_L = \frac{L}{H} \sqrt{\frac{k_v}{k_h}}$$

(k) using developed $N_g$ vs. $R_L$ crossplots of the gravity number ($N_g$) and effective aspect ratio, for a given mobility (M) to determine predicted vertical migration.

28. The method according to claim 27, wherein the method further comprises, changing the microemulsion phase density ($\varrho_{me}$) and determining a new predicted vertical migration.

29. The method according to claim 27, wherein the method further comprises, changing the microemulsion viscosity ($\mu_{me}$) and determining a new predicted vertical migration.

30. The method according to claim 27, wherein the method further comprises, changing the injection rate ($U_T$) and determining a new predicted vertical migration.

31. The method according to claim 27, wherein the method further comprises, changing the well spacing (L) and determining a new predicted vertical migration.

32. A method for improved remediation of a site contaminated with a nonaqueous phase liquid, the method comprising:

(a) predicting the vertical migration of a microemulsion comprising non-aqueous liquid contaminants and a surfactant, the method comprising the following steps with steps (i) through (ix) in any particular order:
  (i) measuring a horizontal permeability ($k_h$) of an aquifer;
  (ii) measuring a vertical permeability ($k_v$) of a aquifer;
  (iii) measuring a thickness (H) of the aquifer;
  (iv) determining the relative permeability to a microemulsion phase ($k_{rme}$);
  (v) determining the relative permeability to a water phase ($k_{rw}$);
  (vi) selecting the microemulsion phase density ($\varrho_{me}$);
  (vii) selecting microemulsion viscosity ($\mu_{me}$);
  (viii) selecting an injection rate ($U_T$);
  (ix) selecting a well spacing (L);
  (x) determining a gravity number ($N_g$), a mobility ratio, (M), and an effective aspect ratio ($R_L$), as follows:

$$N_g = \frac{[k_h k_v]^{1/2} k^*_{rme} \Delta \varrho g}{\mu_{me} U_T}; \quad \Delta \varrho = \varrho_{me} - \varrho_w$$

and $$M = \frac{k_{rme}}{\mu_{me}} \frac{\mu_w}{k_{rw}}$$

$$R_L = \frac{L}{H} \sqrt{\frac{k_v}{k_h}}$$

(xi) using developed $N_g$ vs. $R_L$ crossplots of the gravity number ($N_g$) and effective aspect ratio, for a given mobility (M) to determine predicted vertical migration;

(b) forming an injection well and an extraction well adjacent the contaminated site and spaced apart from one another;
(c) injecting a surfactant into the injection well so as to form a microemulsion; and
(d) withdrawing the microemulsion from the extraction well.

33. The method according to claim 32, wherein step a) comprises, more specifically, predicting the vertical migration of a microemulsion comprising a non-aqueous contaminant, water, a co-solvent and a surfactant.

34. The method according to claim 33, wherein the nonaqueous contaminant is denser than water and the co-solvent is lighter than water.

35. The method according to claim 33, wherein the co-solvent is an alcohol.

36. The method according to claim 32, wherein the depth of the extraction well is determined by the predicted vertical mobility.

37. The method according to claim 32, wherein the method further comprises changing the microemulsion phase density ($\varrho_{me}$) to control vertical migration of the microemulsion and thereby improve extraction of the microemulsion.

38. The method according to claim 32, wherein the method further comprises, changing the microemulsion viscosity ($\mu$) to control vertical migration of the microemulsion and thereby improve extraction of the microemulsion.

39. The method according to claim 32, wherein the method further comprises, changing the injection rate ($U_T$) to control vertical migration and thereby improve extraction of the microemulsion.

40. The method according to claim 32, wherein the method further comprises, changing the well spacing (L) to improve extraction of the microemulsion.

41. A method for manipulating and reducing the amount of vertical migration in an aquifer of a microemulsion containing dense non-aqueous phase liquids, the method comprising:

a) injecting a solution into the aquifer, the solution comprising an effective amount of chemicals which will form a microemulsion, some of the chemicals being lighter than water, so as to make a microemulsion phase having a density substantially the same as groundwater, thereby removing all tendency for vertical migration; and b) controlling a plurality of factors which affect vertical migration and flow rate of the microemulsion through the aquifer, said factors being selected from the group consisting of viscosity of the microemulsion, density of the microemulsion, and injection rate of the solution.

42. A method for manipulating and reducing the amount of vertical migration in an aquifer of a microemulsion containing dense non-aqueous phase liquids, the microemulsion being formed by injecting a solution into the aquifer through an injection well and extracted by horizontal driving forces and through an extraction well, the method comprising:

a) injection a solution into the aquifer to form a microemulsion, the solution being selected to reduce the micro emulsion phase density to a density approximately equal to the density of water, and b) applying increased horizontal driving forces to thereby decrease vertical migration in the microemulsion.

43. The method of claim 42, wherein step (b) comprises increasing injection rate of the solution.

44. The method of claim 42, wherein step (b) comprises increasing the fluid viscosity of the solution.

45. The method according to 42, wherein step (b) comprises decreasing distance between the injection and extraction wells.

46. A method for obtaining a predictable amount of vertical migration of a solubilized dense non-aqueous contaminant having a known density during surfactant-enhanced remediation in a contaminated site, the method comprising:

a) forming an injection well and an extraction well spaced apart from one another;

b) selecting a surfactant for the contaminant to be remediated;

c) selecting a co-solvent having a density lighter than water; and d) injecting the surfactant and co-solvent into the injection well in sufficient quantity to form a microemulsion of nonaqueous contaminants, water, surfactant and co-solvent, the microemulsion having a density less than the density of the nonaqueous contaminants.

47. The method according to claim 46, further comprising: manipulating buoyant and horizontal forces acting on displacement so as to obtain no more than a predetermined amount of vertical migration.

48. The method according to claim 47, wherein the method comprises, more specifically, reducing the microemulsion density to less than the density of water.

49. The method according to claim 46, wherein the method comprises, more specifically, selecting the distance between the injection well and the extraction well to obtain no more than an acceptable amount of vertical mobility between the injection well and the extraction well.

50. The method according to claim 46, wherein the method comprises, more specifically, controlling the injection rate of the surfactant and co-solvent to obtain no more than an acceptable amount of vertical mobility between the injection well and the extraction well.

51. The method according to claim 46, wherein the method comprises injection a solution having at least one of the surfactant and co-solvent and controlling viscosity of the solution to obtain no more than an acceptable amount of vertical mobility between the injection well and the extraction well.

52. A method for reducing the adverse affects of buoyancy on the remediation of nonaqueous phase liquids in a contaminated site, the method comprising:

(a) injecting a co-solvent and a surfactant into the contaminated site so as to form a microemulsion of non-aqueous liquid co-solvent and surfactant, the co-solvent having a first density and the nonaqueous phase liquid having a second density, one of the first and second densities being greater than the density of water and the other having a density less than the density of water.

53. The method according to claim 52, wherein the method comprises, more specifically, forming a microemulsion having a substantially neutral buoyancy with respect to water.

54. The method according to claim 52, wherein the first density is less than water and the second density is greater than water.

55. A method for improving extraction of a dense non-aqueous phase liquid from an aquifer by injecting chemicals into the aquifer through an injection well to form a microemulsion of the dense non-aqueous contaminants and the injected chemicals, and extracting the microemulsion from the aquifer through an extraction well, the method comprising adjusting at least one of the following design parameters: (a) the density of the microemulsion; (b) distance between injection of the chemicals and extraction of the microemulsion; (c) the rate of injection of the chemicals and (d) the viscosity of the microemulsion, to thereby minimize vertical mobility of the microemulsion and improve extraction thereof.

56. The method according to claim 55, wherein the method further comprises sampling the aquifer for at least one of the following environmental factors of the aquifer: (1) horizontal permeability; (2) vertical permeability; (3) aquifer thickness; (4) relative permeability to the microemulsion phase; and (5) relative permeability to the water phase, and adjusting at least one of the design parameters to reduce vertical migration of the contaminant.

57. The method according to claim 55, wherein the density of the microemulsion is adjusted by injecting chemicals in the form of a chemical composition which is sufficiently less dense than the dense non-aqueous phase liquid to reduce the density of the resulting microemulsion.

58. The method according to claim 57, wherein the chemical composition comprises a surfactant, and a co-solvent for controlling density of the microemulsion.

59. The method according to claim 58, wherein the chemical composition includes a polymer.

60. The method according to claim 58, wherein the method further comprises forming a microemulsion having a density approximately the same as groundwater within the aquifer.

61. The method according to claim 55, wherein the method comprises, more specifically, adjusting the rate of injection and/or the viscosity until the driving force applied to the microemulsion prevents undesirable vertical migration.

62. The method according to claim 61, wherein the method further comprises reducing the distance between the injection well and the extraction well to thereby minimize vertical movement of the microemulsion between the injection well and the extraction well.

* * * * *